(12) United States Patent
Palermo et al.

(10) Patent No.: US 12,488,777 B2
(45) Date of Patent: Dec. 2, 2025

(54) CONTROL METHOD FOR AN ELECTRIC ROAD VEHICLE TO REPRODUCE A SOUND ASSOCIABLE WITH A GEAR SHIFT AND RELATED ROAD VEHICLE

(71) Applicant: FERRARI S.P.A., Modena (IT)

(72) Inventors: Antonio Palermo, Modena (IT); Daniele Genova, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/828,221

(22) Filed: Sep. 9, 2024

(65) Prior Publication Data

US 2025/0087202 A1    Mar. 13, 2025

(30) Foreign Application Priority Data

Sep. 11, 2023    (IT) .......................... 102023000018570

(51) Int. Cl.
*G10K 15/04*    (2006.01)

(52) U.S. Cl.
CPC .................................. *G10K 15/04* (2013.01)

(58) Field of Classification Search
CPC ...... G10K 15/04; B60L 2270/42; B60L 15/20
See application file for complete search history.

(56) References Cited

U.S. PATENT DOCUMENTS

| 2008/0060861 A1* | 3/2008 | Baur ........................ B60K 1/00 180/65.6 |
| 2015/0199955 A1 | 7/2015 | Draganic |
| 2021/0053487 A1 | 2/2021 | Vangelov et al. |
| 2022/0063494 A1 | 3/2022 | Duo' et al. |

FOREIGN PATENT DOCUMENTS

CN       102714033 B  * 12/2014  ............. G10K 15/02

OTHER PUBLICATIONS

Italian Search Report for Application No. 202300018570; Filing Date: Sep. 11, 2023; Date of Mailing: Mar. 7, 2024; 7 pages.

* cited by examiner

*Primary Examiner* — Justin Holmes
(74) *Attorney, Agent, or Firm* — CANTOR COLBURN LLP

(57) ABSTRACT

Control method for a vehicle comprising the steps of: providing a memory unit comprising a plurality of audio files corresponding to the sound of a gear shift in a number of predefined operational configurations as a function of at least one vehicular state variable; detecting a gear shift request from a driver to a gear shifting system interface device; detecting an actual operational configuration as a function of the at least one vehicular state variable; selecting one of the audio files stored in the memory unit corresponding to the sound of a gear shift as a function of the actual operational configuration; playing the selected audio file at least within a passenger compartment of the road vehicle.

15 Claims, 5 Drawing Sheets

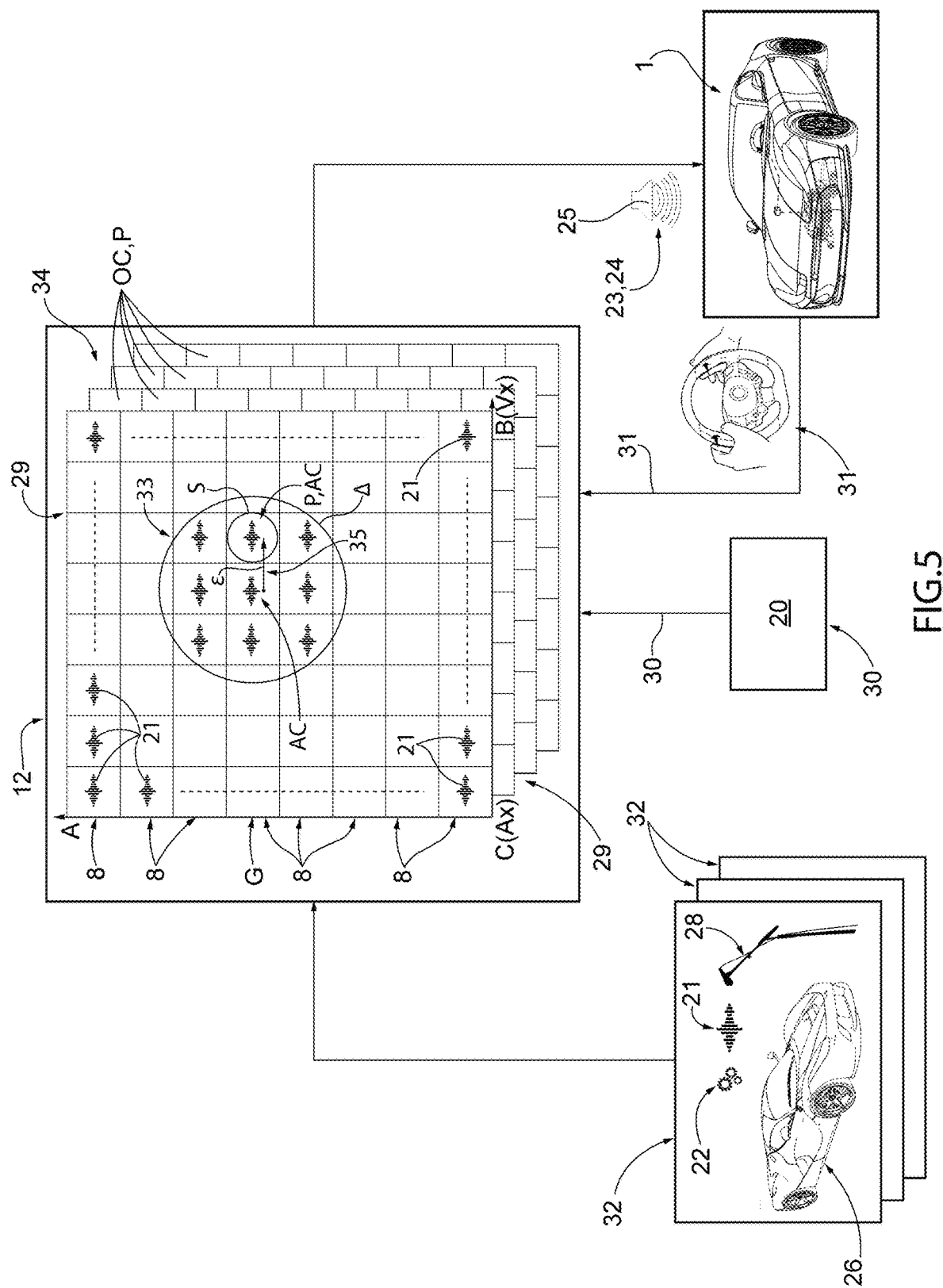

CONTROL METHOD FOR AN ELECTRIC ROAD VEHICLE TO REPRODUCE A SOUND ASSOCIABLE WITH A GEAR SHIFT AND RELATED ROAD VEHICLE

CROSS-REFERENCE TO RELATED APPLICATIONS

This patent application claims priority from Italian patent application no. 102023000018570 filed on Sep. 11, 2023, the entire disclosure of which is incorporated herein by reference.

FIELD OF THE ART

The present invention relates to a control method for an electric road vehicle, in particular a car, driven by a driver and a related road vehicle.

In particular, the present invention finds advantageous, but not exclusive application in the control of a high-performance road vehicle (a car), configured to perform track laps, to which the following description will make explicit reference without thereby losing in generality.

PRIOR ART

Historically, in the technological evolution with the motor vehicle as the protagonist, it became necessary to introduce a gear (or speed) shifting system to overcome the mechanical limits imposed by the internal combustion (endothermic) engine, which, in the absence of the gear shifting system, could not cover an adequate speed range.

In particular, therefore, a gear shifting device is used which allows the transmission ratio to be varied to allow the multiplication of the torque delivered by the endothermic engine and to adapt the rotation speed of the latter to that of the wheels (so that high power can be available even at rather low forward speeds and high speeds can be reached).

This device in the vast majority of the cars is still the mechanically operated gearbox, which allows the pilot to be able to choose depending on the conditions of use of the vehicle between different ratios, i.e. between different gears (the number of gears varies based on the model of the vehicle).

Over the decades, starting from the need for the presence of a gear shifting system dictated by the limits of the endothermic engine, the opportunity arose to create numerous types of gear shifting systems, in particular increasingly high-performance ones (e.g. the well-known dual-clutch gearbox). In this way, the gear shifting system has become a distinguishing feature among motor vehicle manufacturers and, as previously mentioned, a tool for involving the pilot while driving the road vehicle.

In recent times, with the spread of the electric power train systems, we are moving away from the endothermic engine and at least one electric motor is thus being introduced, which solves the need for a gear shift as it is perfectly capable of quickly providing the necessary torque and of going from zero speed to maximum speed without any transmission problem.

Although the electric power train systems tendentially allow to improve performance, as they are always able to take advantage of the maximum acceleration available for a given speed, the pilot's involvement in making certain choices is reduced, such as which gear to use when entering a curve, or the feeling of detachment given by the torque pick-up when upshifting during acceleration or downshifting during deceleration, thereby reducing driving pleasure, especially in the case of high-performance sports vehicles.

As is known, therefore, during its operation, the electric motor emits very slight sounds mostly associated with vibration of the mechanical components of the electric motor.

This introduces a problem of awareness of the driver with respect to the operating conditions of the electric motor and more generally with respect to the performance of the motor vehicle comprising the electric motor.

In practice, from the driver's point of view, the performance of the above-mentioned motor vehicles is not satisfactorily emphasized.

Therefore, the need is felt to emphasize more the performance of the motor vehicles or to increase the awareness of the driver with regard to such performance.

In addition, some drivers are notoriously interested in perceiving sounds associated with the operation of the motor vehicle for reasons of driving pleasure.

Consequently, in high-performance sports cars the sound that is produced by an electric motor is not perceived within the passenger compartment or in any case it may be at least partially unsatisfactory.

Therefore, the need to increase the driver's driving pleasure is also felt.

Patent document US2022063494A1 describes a method of controlling an electric motorcycle including a performance and sound emulator.

Patent document US2015199955A1 describes a system for generating a traditional driving experience in an electric vehicle.

Aim of the present invention is to realise a control method for an electric road vehicle driven by a driver and a related road vehicle, which are at least partially free from the drawbacks described above and, at the same time, are simple and inexpensive to realise.

SUMMARY

In accordance with the present invention, there are provided a control method for an electric road vehicle driven by a driver and a related road vehicle as claimed in the following independent claims and, preferably, in any one of the claims directly or indirectly dependent on the independent claims.

The claims describe preferred embodiments of the present invention forming an integral part of the present disclosure.

BRIEF DESCRIPTION OF THE DRAWINGS

The present invention will now be described with reference to the enclosed drawings, showing some non-limiting embodiments thereof, wherein:

FIG. 5 is a diagram of a second embodiment of the method of FIG. 3.

PREFERRED EMBODIMENTS OF THE INVENTION

With reference to the attached figures, 1 denotes as a whole a road vehicle in accordance with non-limiting embodiments of the present invention. In particular, the road vehicle 1 is a car.

The same numbers and the same reference letters in the figures identify the same elements or components with the same function.

In the context of this disclosure, the term "second" component does not imply the presence of a "first" component. These terms are in fact used as labels to improve clarity and should not be understood in a limiting way.

The elements and features shown in the various preferred embodiments, including the drawings, may be combined with each other without thereby departing from the scope of protection of the present application as described below.

It should be noted that in the remainder of this description, expressions such as "above", "below", "front", "rear" and the like are used with reference to conditions of normal forward moving of the road vehicle 1 along the normal forward direction D.

Figure 1:
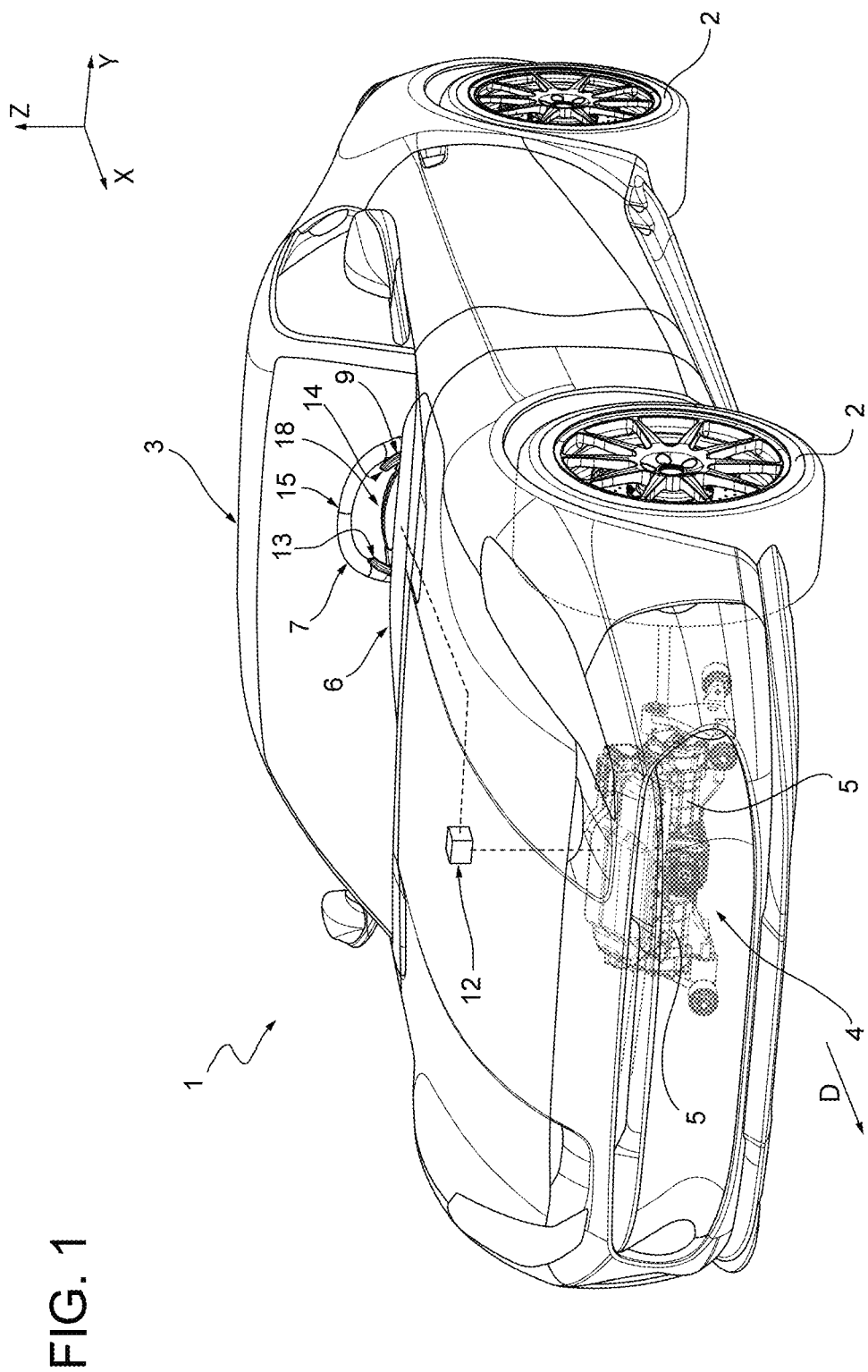
FIG. 1 is a perspective and schematic view of a road vehicle in accordance with the present invention and provided with an electric power train system.

As shown in the non-limiting embodiment of FIG. 1, it is also possible to define:
- a longitudinal axis X, integral with the vehicle 1 and arranged, in use, horizontal and parallel to a normal forward direction D of the vehicle 1;
- a transverse axis Y, integral with the vehicle 1 and arranged, in use, horizontal and orthogonal to the axis X; and
- a vertical axis Z, integral with the vehicle 1 and arranged, in use, vertical and orthogonal to the axes X, Y.

In particular, the road vehicle 1 is provided with two front wheels 2 and two rear wheels 2 of which at least one pair are drive wheels.

Figure 2:
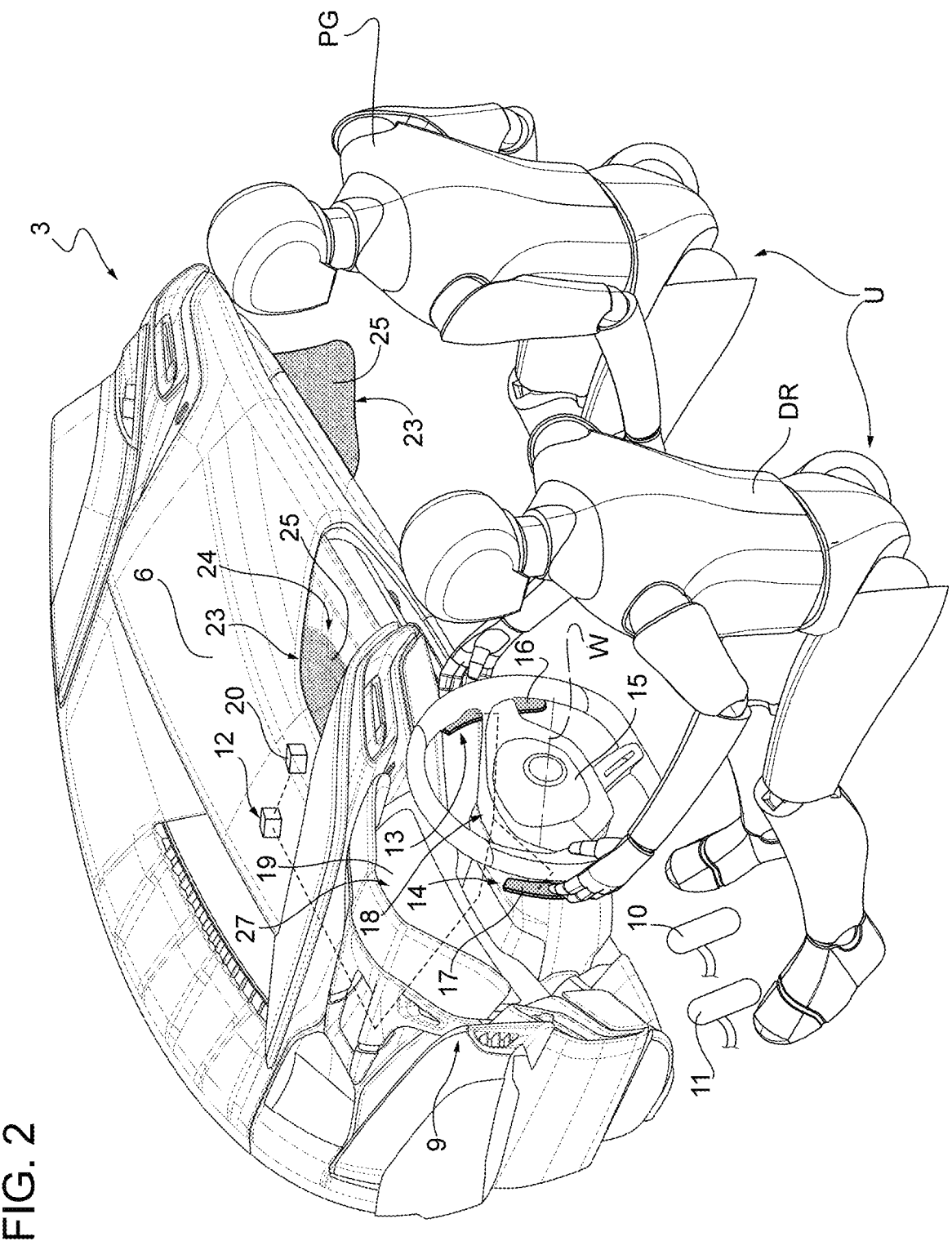
FIG. 2 is a perspective view, with details removed for the sake of clarity, of part of the interior of the road vehicle of FIG. 1.

The vehicle 1 is provided with a passenger compartment 3 which is adapted to house one or more users U, such as the driver DR and one or more passengers PG as shown in FIG. 2.

In the non-limiting embodiment of FIG. 1, the vehicle 1 comprises an electric power train system 4 configured to deliver drive torque to the at least two drive wheels 2, in particular arranged at the front axle of the road vehicle 1 (i.e. the vehicle has a front-wheel drive).

In other non-limiting and not shown embodiments, the power train system 4 is arranged at a rear axle (i.e. the vehicle has rear-wheel drive).

In further non-limiting and not shown embodiments, the power train system is 4 arranged at both 41 of the aforementioned axles (i.e. the vehicle has all-wheel-drive).

In particular, each single-axle drive can be defined by a single electric motor 5, optionally coupled to a differential, or by a pair 5 of electric motors.

In particular, in the case of an all-wheel drive, it may comprise two electric motors 5 (one front and one rear), three electric motors 5 or one electric motor 5 for each wheel 2 of the road vehicle 1.

The vehicle 1 also comprises a vehicular dashboard 6, which is arranged in front of the driver DR and any passenger PG and is of a known type and therefore not further detailed below.

Advantageously, moreover, the vehicle 1 comprises a gear shifting system 9, which is configured to allow the driver DR to select a virtual gear 8 among a plurality of virtual gears 8 and to shift from one virtual gear to another while driving.

In particular, the gear shifting system 9 comprises an interface system 7 in accordance with what is described below.

In particular, the selection of the virtual gear 8 by the driver DR influences (limits) the drive torque delivered by the electric motor 5 (in a known manner and therefore not further detailed).

According to some non-limiting embodiments, each of the virtual gears 8 determines a torque T limit profile that can be delivered by the power train system 4 to the wheels 2 as the velocity of the road vehicle 1 along the normal forward direction varies.

Preferably, the word "virtual gears", taking into account that the electric power train system 4 does not require a mechanical gearbox, as in the case of conventional internal combustion engines, means the imposition of an upper limit on the longitudinal acceleration Ax (positive or negative) and, consequently, on the tractive power (i.e. torque) delivered to the wheels 2 of the road vehicle 1.

What is described in this document is in particular to be considered valid both in a thrust, i.e. acceleration, configuration, in which the only pedal operated by the driver DR is an accelerator pedal 10, and in release (where no pedal is operated) or braking configurations, in which a brake pedal 11 usually present alongside the pedal 10 is used, as shown in FIG. 2.

In other words, what has been described remains valid for both virtual 8 up-shift and virtual 8 down-shift increments.

The road vehicle 1 further comprises a memory unit 20, which comprises a plurality of audio files 21 corresponding to the sound of a gear shift 22 in a number of predefined operational configurations OC depending on at least one vehicular state variable A.

Figure 3:
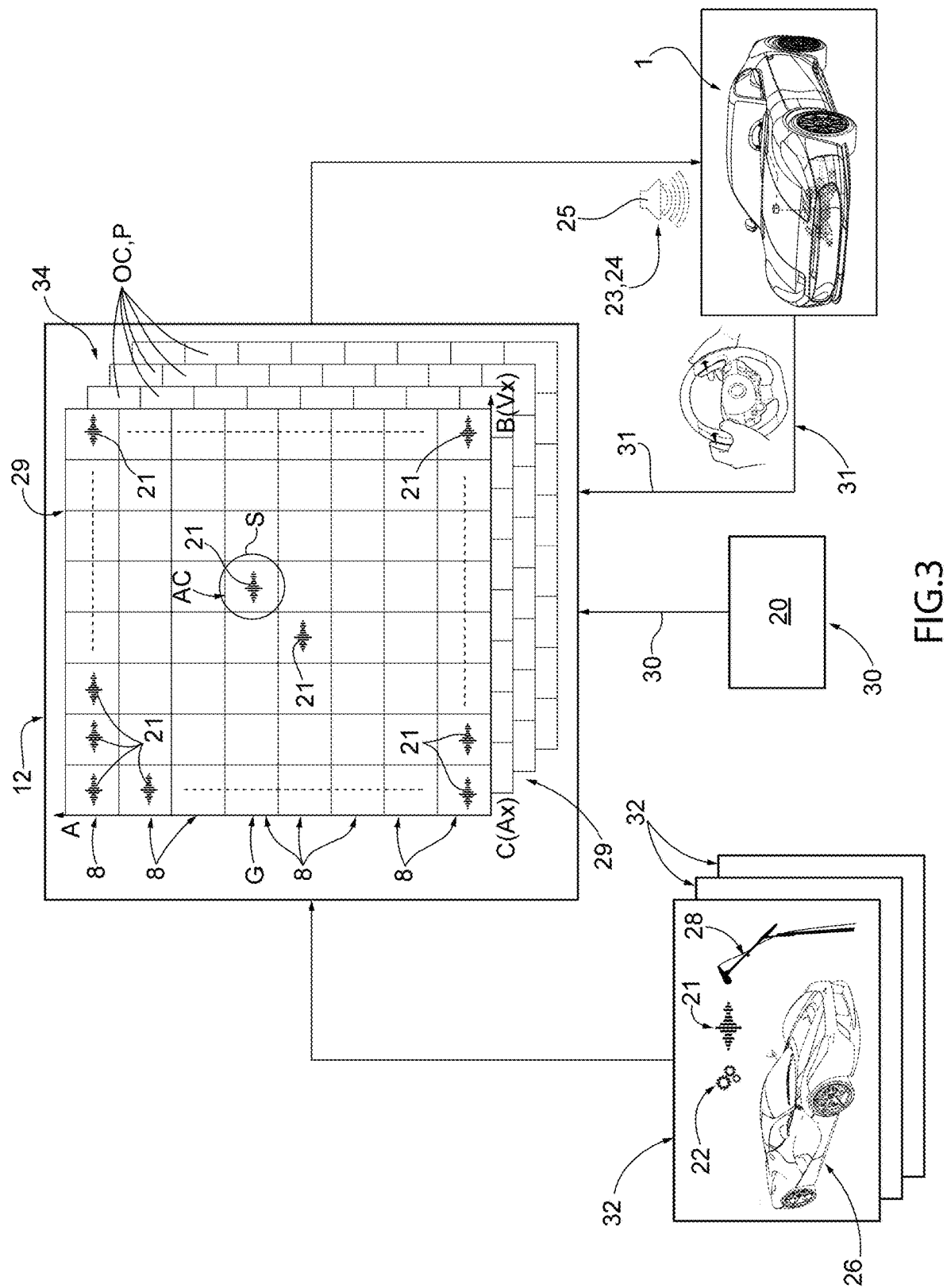
FIG. 3 is a diagram of a control method of the road vehicle of FIG. 1 to reproduce a sound within the passenger compartment.
Figure 4:
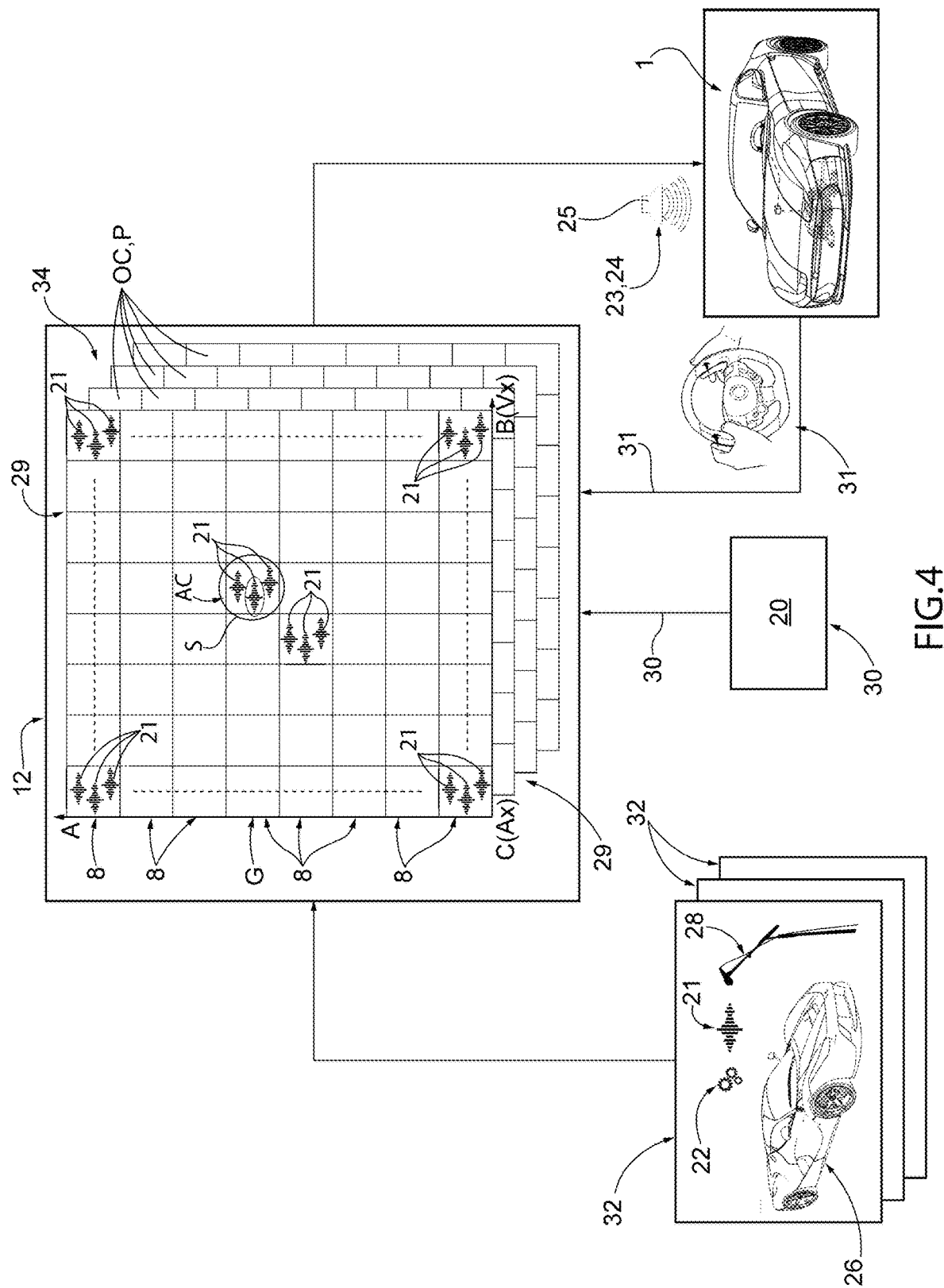
FIG. 4 is a diagram of what occurs in a first embodiment of the method of FIG. 3.

In particular, the audio files 21 relate to the sound of a mechanical gear shift 22 (as schematically outlined in the non-limiting embodiments of FIGS. 3 to 5).

Advantageously, the vehicle 1 comprises an electronic control unit ("ECU"—schematically shown in FIGS. 1 and 2) 12, which is configured to detect, while driving, a gear shift request of the virtual gear 8 provided by the driver DR to the interface system 7 of the system 9.

Furthermore, the control unit 12 is configured to detect an actual operational configuration AC as a function of the at least one vehicular state variable A.

In addition, the control unit 12 is configured to select one of the audio files 21 stored in the memory unit 20 corresponding to the sound of a gear shift 22 as a function of the actual operational configuration AC.

Finally, the road vehicle 1 comprises a reproduction system 23, which is connected to the control unit 12, in particular is controlled by the control unit 12, and is configured to play the selected audio file 21 at least within the passenger compartment 3.

In particular, the reproduction system 23 comprises a stereo system 24, which in turn comprises a plurality of speakers 25 installed within the passenger compartment 3. In detail, the stereo system 24 is of a known type and will not be further detailed below.

According some not shown to non-limiting and embodiments, the reproduction system 23 is configured to reproduce the selected audio file 21 so that it is also audible from outside the passenger compartment 3, in particular near/in the vicinity of the road vehicle 1. In this case, the system 23 may provide speakers external to the passenger compartment 3, for example at a platform or exhaust pipe.

Advantageously but not necessarily, the control unit 12, among other things, processes a plurality of data and regulates the behaviour of the road vehicle 1 both on a straight line and while travelling along a curve by intervening, for example, both on the torque delivered by the electric motors 5 towards the drive wheels 2, and on the management of any active suspension shock absorbers.

Physically, the control unit 12 can be composed of a single device or of several devices separated from each other and communicating through the local (e.g. CAN, Ethernet, etc.) of the road vehicle 1.

Advantageously but not necessarily, as shown in the non-limiting embodiment of FIG. 2, the interface system 7 comprises at least one first drive device 13 operable by the driver with the right hand and at least a second drive device 14 operable by the driver with the left hand.

According to some non-limiting embodiments, one between the first drive device 13 and the second drive device 14 is configured to allow the driver DR to shift to the higher virtual gear 8 (up-shift) and the other between the first drive device 13 and the second drive device 14 is configured to allow the driver DR to shift to the lower virtual gear 8 (down-shift).

Advantageously but not necessarily, the vehicle 1 comprises a steering wheel 15, which is rotatable about a central steering axis W.

Preferably but not in a limiting manner, the first drive device 13 and the second drive device 14 are arranged respectively to the right and to the left of the central steering axis W, in particular symmetrically, in particular so as to face each other and extend radially from said central steering axis W.

In some non-limiting cases, the drive device 13 is a right paddle 16 (or right lever) and the drive device 14 is a left paddle 17 (or left lever) of a gear shift control assembly 18 of a known type and not further detailed below.

In other non-limiting and not shown cases, the drive device 13 and the drive device 14 are buttons, levers or handles.

In further non-limiting and not shown cases, the drive device 13 and the drive device 14 are different from each other and chosen from those previously indicated.

Advantageously but not necessarily, the road vehicle 1 is a high-performance sports vehicle, i.e. configured to perform laps on the track reaching speeds above 250 km/h, in particular 300 km/h.

In accordance with a further aspect of the present invention, there is provided a control method for an electric road vehicle (driven by a driver DR).

The above-described road vehicle 1, in particular the control unit 12, is configured to carry out the method that will be described below.

The method comprises the step 30 of providing the memory unit 20 comprising the plurality of audio files 21 corresponding to the sound of a gear shift 23 in a number of predefined operational configurations OC as a function of at least one vehicular state variable A, B, C.

In some non-limiting cases, the memory unit 20 is comprised in the road vehicle 1, i.e. is on board the road vehicle 1. In other non-limiting cases, the memory unit is decentralized and is consulted by the road vehicle 1, in particular by the control unit 12 electronically, for example via a data network.

The method further comprises the step 31 of detecting a gear shift request 8 provided by the driver DR to the interface device 7 of the gear shifting system 9.

In particular, then the control unit 12 detects if, for example by means of the right paddle 16, the driver DR requests the vehicle 1 to increase the virtual gear 8 (up-shift). Obviously, the same considerations apply in relation to a possible gear down-shift 8.

In addition, the method comprises detecting an actual operational configuration AC as a function of the at least one vehicular state variable A, B, C (e.g. the gear that the driver DR has requested to engage, the velocity Vx of the road vehicle 1, the acceleration Ax, the position of the accelerator pedal 10, the opening state of the roof if removable, etc.). In other words, the method provides for taking a picture of the state in which the road vehicle 1 is located.

Next, the method comprises the steps of selecting one of the audio files 21 stored in the memory unit 20 corresponding to the sound of a gear shift 23 as a function of the actual operational configuration AC, and of playing the selected audio file 21 at least within the passenger compartment 3 of the road vehicle 1 (via the speakers 25 described above).

The method steps listed above are preferably sequential to each other.

Advantageously but not in a limiting manner, as schematically outlined in the embodiments of FIGS. 3 to 5, the audio files 21 corresponding to the sound of a gear shift 23 are recordings of real road vehicles 26 with mechanical gear shift 23.

In particular, advantageously but not necessarily, the road vehicles 26 are vehicles with internal combustion engine.

In some non-limiting cases, the road vehicles 26 are historic cars, i.e. built at least 20 years ago.

In particular, the model of the real road vehicle 26 for selecting the audio file 21 is selectable by the driver DR by means of an additional vehicular (for example a vehicular screen 19) or remotely operated (for example a mobile phone or a tablet, through a special software application) interface device 27.

In some non-limiting and not shown cases, the audio files 21 are artificially generated according to predefined classes. For example, the driver DR can select, through the additional interface device 27, whether to play an audio file 21 with a historical, modern or futuristic, adrenaline-filled, relaxed sound, for example by composing appropriate sounds for each class (which may, for example, correspond to the moods of the driver DR).

Obviously, intermediate embodiments are also possible, for example in which a driver DR selects to play audio files 21 randomly among a plurality of historical models, whose mechanical gear shifts from one gear to another have been acoustically recorded.

According some to preferred but non-limiting embodiments, as schematically shown in FIGS. 3 to 5, the method also comprises the further step 32 of recording said audio files 21 by recording the sound of a plurality of gear shifts 22 of at least one real vehicle 26 in the number of predefined operational configurations OC. In particular, by means of special recording equipment 28 the sound of each gear shift (for example, from second to third gear, from third to fourth, from fourth to fifth, from second to fourth, from third to fifth, and so on and vice versa) is recorded at different successive longitudinal velocities Vx and/or at different successive longitudinal accelerations Ax and/or for different positions of the accelerator pedal 10 (and/or of the roof that can optionally be opened, etc.).

Therefore, advantageously but not in a limiting manner, the predefined operational configurations OC and the actual operational configuration AC are defined at least by a first vehicular state variable A and a second vehicular state variable B.

In particular, the first vehicular state variable A comprises (is) the gear to be engaged (optionally with the addition of the gear from which one starts, if one even wants to differentiate these cases).

In particular, the second vehicular state variable B comprises (is) the longitudinal velocity Vx of the road vehicle 1.

In some non-limiting cases, the predefined operational configurations OC and the actual operational configuration AC are also defined by a third vehicular state variable C, which, in particular, comprises (is) the longitudinal acceleration Ax (positive or negative) of the road vehicle 1.

Preferably, but not in a limiting manner, to reduce the number of recordings and therefore of samples of audio files 21 in the memory unit 20, the method provides for discretizing each variable A, B, C (especially the variables B and C, as they are potentially continuous) by dividing them into finite sets of values. For example, the same audio file 21 is played for values of the variable B in groups of 10 km/h, that is, the same audio file 21 is played for values from 20 to 30 km/h, as well as the same audio file 21 is played for values from 30 and 40 km/h and so on.

Advantageously but not in a limiting manner, and as shown in the non-limiting embodiments of FIGS. 4 and 5, in order to create a random effect, i.e. to avoid that under identical actual operational conditions AC the driver DR can realize that he or she is listening to the same audio file 21, the method comprises a step 33 of randomizing the selection of the audio file 21. In this way, it is therefore avoided that always identical sounds are reproduced at identical operational configurations AC.

In particular, in FIGS. 3 to 5 the selected audio files 21 are highlighted by a selection edge S.

In the non-limiting embodiment of FIG. 3, the selected audio files 21 correspond exactly to the actual operational configuration AC.

According to a first non-limiting embodiment shown in FIG. 4, wherein the step of randomising 33 comprises a step 34 of stochastically selecting an audio file 21 from a set of audio files 21 corresponding to the same predefined operational configuration AC. In particular, therefore, multiple audio files 21 correspond to a same predefined configuration AC, among which one is selected stochastically/randomly (or in rotation) according to known randomization methods and therefore not further detailed below.

According to a second non-limiting embodiment shown in FIG. 5, the step of randomising 33 comprises a step 35 of stochastically deviating by a value ε less than a threshold value Δ of at least one of the state variables A, B, C of the actual configuration AC, resulting in a randomised actual configuration RAC. In this case, therefore, the audio file 21 is selected to be played by the reproduction system 23 as a function of the randomised actual configuration RAC. In particular, the threshold value Δ of the variable B is less than 5 km/h.

Preferably but not in a limiting manner, during the deviating step 35, the value of the longitudinal velocity Vx (or of the acceleration Ax) of the actual configuration is randomly increased or decreased by an (predefined) error to obtain the randomized actual configuration RAC and then select the audio file 21.

Compared to the first embodiment described above, this second embodiment allows to significantly reduce the amount of audio files 21 that the memory unit 20 must store.

Preferably but not in a limiting manner, and as shown in the non-limiting embodiments of FIGS. 3 to 5, the audio files 21 populate a matrix 29 having a dimension for each of the state variables A, B, C.

In particular, a two-dimensional matrix 29 is shown having a dimension for variable A and one for variable B.

In other non-limiting cases, the matrix 29 is three-dimensional or multidimensional, having a dimension for each vehicular state variable A, B, C, . . . .

Therefore, in accordance with what has been said so far, as a function of the actual operational configuration AC (optionally randomized as described above), a box P of said matrix 29 corresponding to the audio file 21 to be played is selected.

In other words, the matrix 29 corresponds to a look-up table whose values, instead of the scalar ones, are the audio files 21 to be selected. Alternatively, of course, the matrix 29 has its boxes filled with pointers to the memory areas where the respective corresponding audio files 21 are housed.

Advantageously but not in a limiting manner, a time equal to or less than one second, in particular 500 ms, more in particular 250 ms, preferably 150 ms elapses between the detecting step and the reproducing step.

According to some non-limiting embodiments, the control unit 12 continuously selects (for example cyclically at time intervals of less than 2 seconds) the audio file 21 to be played as a function of the actual configuration AC, so as to always have it ready for reproduction as soon as the driver DR requests a gear shift 8.

In use, therefore, the driver DR chooses a road vehicle model 26 from a predefined range (for example a Ferrari 250 GTO or an F1) and shifts the virtual gears 8 at will, thus varying the percentage of delivery of the torque to the drive wheels 2 by the power train system 4. In particular, gear shifting takes place by means of the interface system 7, for example the paddles 16 and 17. As soon as the unit 12 detects the gear shift (for example the so-called "paddle shift", i.e. the movement of one of the paddles 16, 17 towards the driver), the control unit 12 commands the reproduction system 23 to play the selected audio file 21 as previously described, for example the sound of the selected gear shift of the vehicle 26 from the third to the fourth gear at a certain speed. In this way, the driver DR perceives the transient given by the gear shift, increasing the driving pleasure.

Although the above-described invention makes particular reference to a very precise embodiment, it shall not be deemed as limited to that embodiment, since all those variations, modifications or simplifications covered by the appended Claims, such as a different type of electric motorization, a different type of interface system 7, a different type of virtual gears, etc., fall within its scope.

The vehicle and the method described above have numerous advantages.

First of all, the present invention makes it possible to make the sound of an electric vehicle more appealing and involving, improving driving pleasure.

In addition, the driver is allowed to be aware, even from an auditory point of view, of the performed shift from one gear to another, even if they are virtual. In this way it is also possible to involve the pilot more with respect to the possible action of an automatic electronic control system.

A further advantage of the present invention lies in further increasing the driving pleasure, precisely by virtue of the fact that it appears to be more customizable by selecting the type of sound of the gear shift based on personal taste, a perceptual preference while driving on the track or an emotional state.

Finally, the control method described above is simple and inexpensive to implement in a road vehicle 1, as it does not require the addition of any physical components and can be completely realised via software by exploiting the architectures already normally present on board the road vehicle 1.

It is important to note that the method described above does not involve a high computing capacity, nor an extensive amount of memory and therefore its implementation is possible in a known control unit without the need for updates or upgrades.

LIST OF REFERENCE NUMBERS OF THE FIGURES 1 vehicle
2 wheels
3 passenger compartment
4 power train system
5 electric motor
6 dashboard
7 interface system
8 virtual gears
9 gear shifting system
10 accelerator pedal
11 brake pedal
12 control unit
13 first drive device
14 second drive device
15 steering wheel
16 right paddle
17 left paddle
18 gear shift control assembly
19 vehicular screen
20 memory unit
21 audio file
22 gear shift
23 reproduction system
24 stereo system
25 speakers
26 road vehicles
27 additional interface device
28 recording equipment
29 matrix
30 step of providing the memory
31 detecting step
32 recording step
33 randomising step
34 selecting step
35 deviating step
A variable
AC actual operational configuration
Ax acceleration
B variable
C variable
D forward direction
DR driver
G selected virtual gear
OC predefined operational configurations
P box
PG passenger
RAC actual randomized configuration
S selection edge
U users
Vx velocity
X axis
Y axis
Z axis
Δ threshold value
ε error value

The invention claimed is:

1. A control method for an electric road vehicle (1) comprising an electric power train system (4) configured to deliver, by means of at least one electric motor (5), drive torque to at least two wheels (2) of the road vehicle (1); the road vehicle (1) comprising a gear shifting system (9), which allows the driver (DR) to select one among a plurality of virtual gears (8) and to shift from one virtual gear to another while driving;

the method further comprising:
providing a memory unit (20) storing a plurality of audio files (21) corresponding to the sound of a gear shift in a number of predefined operational configurations (OC) as a function of at least one vehicular state variable (A, B, C);
detecting a gear shift request from a driver (DR) via a gear shift system interface device (9);
detecting an actual operational configuration (AC) as a function of the at least one vehicular state variable (A, B, C);
selecting one of the audio files (21) stored in the memory unit (20) corresponding to the sound of a gear shift as a function of the actual operational configuration (AC);
recording said audio files (21) by recording the sounds of a plurality of gear shifts of the at least one real vehicle (26) in the number of predefined operational configurations (OC), wherein the audio files (21) corresponding to the sound of the gear shift are recordings from real road vehicles (26) with a mechanical gear shift;
playing the selected audio file (21) at least within a passenger compartment (3) of the road vehicle (1).

2. The method according to claim 1, wherein the audio files (21) corresponding to the sound of the gear shift are recordings from a model of the real road vehicle (26) and is selectable by the driver (DR) by means of an additional vehicular or remotely operated interface device (27).

3. The method according to claim 1, wherein the predefined operational configurations (OC) and the actual operational configuration (AC) are defined by at least a first vehicular state variable (A) and a second vehicular state variable (B); wherein the first vehicular state variable (A) comprises the gear to be engaged; wherein the second vehicular state variable (B) comprises the velocity (Vx) of the road vehicle (1).

4. The method according to claim 3, wherein the predefined operational configurations (OC) and the actual operational configuration (AC) are also defined by a third vehicular state variable (C); wherein the third vehicular state variable (C) comprises the acceleration of the road vehicle (1).

5. The method according to claim 1 and comprising a step of randomising the selection of the audio file (21) so as to prevent identical operational configurations from always playing identical sounds.

6. The method according to claim 5, wherein the step of randomising comprises a step of stochastically selecting an audio file (21) from a set of audio files (21) corresponding to the same predefined operational configuration (OC).

7. The method according to claim 5, wherein the step of randomising comprises a step of stochastically deviating by a value less than a value (A) threshold of at least one of the state variables of the actual configuration (AC), resulting in a randomised actual configuration (RAC); wherein the audio file (21) is selected according to the randomised actual configuration (RAC).

8. The method according to claim 7, wherein the at least one state variable (A, B, C) is the longitudinal velocity (Vx)

of the road vehicle (1), wherein, during the deviating step, the value of the longitudinal velocity (Vx) of the actual configuration (AC) is randomly increased or decreased by an error ($\varepsilon$) to obtain the randomized actual configuration (RAC) and then select the audio file (21).

9. The method according to claim 1, wherein the audio files (21) populate a matrix (29) having a dimension for each of the state variables (A, B, C); wherein, depending on the actual operational configuration (AC), a box (P) of said matrix (29) corresponding to the audio file (21) to be played is selected.

10. A road vehicle (1) comprising:
four wheels (2), of which at least two are drive wheels (2);
passenger compartment (3) configured to accommodate at least one driver (DR);
an electric power train system (4) configured to deliver, by means of at least one electric motor (5), drive torque to the at least two drive wheels (2);
gear shift system (9), which is configured to allow the driver (DR) to select one among a plurality of virtual gears (8) and to shift from one virtual gear to another while driving;
a memory unit (20) storing a plurality of audio files (21) corresponding to the sound of a gear shift in a number of predefined operational configurations (OC) depending on at least one vehicular state variable (A, B, C);
a control unit (12), which is configured for:
detecting a gear shift request provided by the driver (DR) via the gear shift system (9);
detecting an actual operational configuration (AC) as a function of at least one vehicular state variable (A, B, C); and
selecting one of the audio files (21) stored in the memory unit (20) corresponding to the sound of a gear shift as a function of the actual operational configuration (AC), wherein said audio files (21) are recorded sounds of a plurality of gear shifts of the at least one real vehicle (26) in a number of predefined operational configurations (OC), and wherein the audio files (21) correspond to the sounds of the gear shift from real road vehicles (26) with a mechanical gear shift; and
a reproduction system (23), connected to the control unit (12) and configured to play the selected audio file (21) at least within the passenger compartment (3).

11. The road vehicle (1) according to claim 10, wherein the reproduction system (23) comprises a stereo system (24), which in turn comprises a plurality of speakers (25) installed within the passenger compartment (3).

12. The road vehicle (1) according to claim 10, wherein the reproduction system (23) is configured to reproduce the audio file (21) so that it is also audible from outside the passenger compartment (3).

13. The road vehicle (1) according to claim 10, wherein the gear shift system (9) comprises an interface system (7) configured to allow the driver (DR) to select a virtual gear from a plurality of virtual gears (8); wherein the interface system (7) comprises at least a first device (13) operable by the driver (DR) with the right hand and at least a second device (14) operable by the driver (DR) with the left hand;
wherein one between the first device (13) and the second device (14) is configured to allow the driver (DR) to shift to the higher virtual gear and the other between the first device (13) and the second device (14) is configured to allow the driver (DR) to shift to the lower virtual gear.

14. The road vehicle (1) according to claim 13 and comprising a steering wheel (15), wherein the steering wheel is rotatable about a central steering axis,
wherein the first actuating device (13) and the second actuating device (14) are paddles arranged respectively to the right and to the left of said central steering axis, preferably symmetrically, in particular so as to face each other and extend radially from said central steering axis.

15. The vehicle (1) according to claim 10, wherein the control unit (12) is configured to carry out the method according to claim 1.

* * * * *